(12) United States Patent
Kida et al.

(10) Patent No.: US 6,620,552 B2
(45) Date of Patent: Sep. 16, 2003

(54) LITHIUM SECONDARY BATTERY

(75) Inventors: Yoshinori Kida, Hirakata (JP); Katsunori Yanagida, Itami (JP); Atsushi Yanai, Minoo (JP); Atsuhiro Funahashi, Suita (JP); Toshiyuki Nohma, Hirakata (JP); Ikuo Yonezu, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 177 days.

(21) Appl. No.: 09/841,033

(22) Filed: Apr. 25, 2001

(65) Prior Publication Data

US 2001/0046626 A1 Nov. 29, 2001

(30) Foreign Application Priority Data

Apr. 25, 2000 (JP) .......................... 2000-123426

(51) Int. Cl.⁷ .................. H01M 10/40; H01M 10/36
(52) U.S. Cl. .................. 429/245; 429/188; 429/324
(58) Field of Search .................. 429/324, 325, 429/224, 188, 245

(56) References Cited

U.S. PATENT DOCUMENTS

| | | | | |
|---|---|---|---|---|
| 4,520,083 A | * | 5/1985 | Prater et al. | 429/101 |
| 5,270,134 A | * | 12/1993 | Tobishima et al. | 429/331 |
| 6,190,803 B1 | * | 2/2001 | Tomiyama et al. | 429/245 |

FOREIGN PATENT DOCUMENTS

| | | | | |
|---|---|---|---|---|
| JP | 04188571 A | * | 7/1992 | H01M/10/40 |
| JP | 10040921 A | | 2/1998 | |
| JP | 2000138077 A | * | 5/2000 | H01M/10/40 |

* cited by examiner

*Primary Examiner*—Carol Chaney
(74) *Attorney, Agent, or Firm*—Armstrong, Westerman & Hattori, LLP

(57) ABSTRACT

A lithium secondary battery according to the present invention includes a positive electrode in which an aluminum foil containing manganese is used as a current collector, a negative electrode, and a non-aqueous electrolyte solution formed by dissolving lithium salt in a non-aqueous solvent wherein divalent manganese salt is added to said non-aqueous electrolyte solution.

11 Claims, 1 Drawing Sheet

LITHIUM SECONDARY BATTERY

BACKGROUND OF THE INVENTION

1. Field of the Invention

The present invention relates generally to a lithium secondary battery provided with a positive electrode in which an aluminum foil containing manganese is used as a current collector, a negative electrode, and a non-aqueous electrolyte solution formed by dissolving lithium salt in a non-aqueous solvent, and more particularly, to the lithium secondary battery having excellent storage characteristics in a charged state through betterment of the non-aqueous electrolyte solution.

2. Description of the Related Art

Various efforts have been made to develop lithium secondary batteries widely used as a power source of portable electronic equipments such as portable telephones or digital cameras as quality of such portable electronic equipments has been improved.

For example, using an aluminum foil containing 0.6 to 2.0 wt % of manganese as a positive electrode current collector has been proposed in Japanese Patent Laid-Open No. Hei10 (1998)-40921. According to the Patent Laid-Open, strength of the aluminum foil is improved by containing manganese. As a result, cracks in the positive electrode current collector by forth applied to the positive electrode which is caused by expansion of a negative electrode active material during charging is prevented, thus storage characteristics in a charged state is improved.

However, the storage characteristics of the lithium secondary battery in the charged state is not fully improved only by using the above-mentioned aluminum foil containing 0.6 to 2.0 wt % of manganese as the positive electrode current collector. The inventors of the present invention notice that it is because manganese contained in the aluminum foil elutes into the non-aqueous electrolyte solution while the lithium secondary battery is stored in the charged state, thus, the strength of the positive electrode current collector is decreased.

SUMMARY OF THE INVENTION

An object of the present invention is to attain a lithium secondary battery having excellent storage characteristics in a charged state.

Another object of the present invention is to prevent manganese contained in an aluminum foil from eluting into a non-aqueous electrolyte solution while a lithium secondary battery is stored in a charged state, thus to prevent strength of the aluminum foil from decreasing.

A lithium secondary battery according to the present invention is a lithium secondary battery provided with a positive electrode in which the aluminum foil containing manganese is used as a current collector, a negative electrode, and a non-aqueous electrolyte solution formed by dissolving lithium salt in a non-aqueous solvent wherein divalent manganese salt is added to said non-aqueous electrolyte solution.

Manganese contained in the aluminum foil is prevented from eluting into the non-aqueous electrolyte solution while the lithium secondary battery is stored in the charged state, thus the strength of the current collector is prevented from decreasing, as the result, the lithium secondary battery having excellent storage characteristics in the charged state is attained by adding the divalent manganese salt to the non-aqueous electrolyte solution.

In the current collector which is the above-mentioned aluminum foil containing manganese, when content by amount of manganese contained in the aluminum foil is less than 0.6 wt %, the strength of the current collector is not fully improved. On the other hand, when the content by amount of manganese is more than 2.0 wt %, the current collector gets too hard to process. Therefore, the aluminum foil containing 0.6 to 2.0 wt % of manganese is preferable as the above-mentioned current collector.

The strength of the current collector is improved by using such current collector. As the result, cracks in the positive electrode current collector by forth applied to the positive electrode which is caused by expansion of a negative electrode active material during charging is prevented, thus the storage characteristics in the charged state is improved.

Examples of material for such current collector include Al alloy 3003, 3203, 3004, 3104, and 3005 of Japanese Industrial Standards.

Lithium salt used in the above-mentioned non-aqueous electrolyte solution may be a sole type or a combination of 2 or more types of known lithium salt which has been conventionally generally used. As lithium salt, the lithium salt represented by a constitutional formula $LiN(R^1SO_2)(R^2SO_2)$ wherein the $R^1$ and $R^2$ are of perfluoro alkyl group, the $R^1$ and $R^2$ may be the same or different from each other, and a total of number of carbon in the $R^1$ and $R^2$ is not less than 3 and the lithium salt represented by the constitutional formula $LiC(R^3SO_2)(R^4SO_2)(R^5SO_2)$ wherein the $R^3$, $R^4$, and $R^5$ are of perfluoro alkyl group, the $R^3$, $R^4$, and $R^5$ may be the same or different from each other, and the total of the number of carbon in the $R^3$, $R^4$, and $R^5$ is not less than 3 which are excellent in stability are preferably used.

In each of the above-mentioned lithium salt, when the lithium salt in which the total of the number of carbon in the above-mentioned $R^1$ and $R^2$ is more than 6 or the lithium salt in which the total of the number of carbon in the above-mentioned $R^3$, $R^4$, and $R^5$ is more than 6 is used, viscosity of the non-aqueous electrolyte solution is increased, thus battery characteristics is decreased. Therefore, the lithium salt in which the total of the number of carbon in the above-mentioned $R^1$ and $R^2$ is in the range of 3 to 6 or the lithium salt in which the total of the number of carbon in the above-mentioned $R^3$, $R^4$, and $R^5$ is in the range of 3 to 6 are preferably used. As such lithium salt, at least one type of lithium salt selected from the group consisting of $LiN(C_2F_5SO_2)_2$, $LiN(CF_3SO_2)(C_4F_9SO_2)$, and $LiC(CF_3SO_2)_3$ are preferably used, and more preferably, $LiN(C_2F_5SO_2)_2$.

In preparing the non-aqueous electrolyte solution by dissolving the above-mentioned lithium salt in the non-aqueous solvent, concentration of lithium salt is preferably set in the range of 0.6 to 1.5 mol/l and more preferably, in the range of 0.9 to 1.3 mol/l.

As the non-aqueous solvent to dissolve the above-mentioned lithium salt, known non-aqueous solvents which have been conventionally generally used may be used. Examples of the such non-aqueous solvents include ethylene carbonate, propylene carbonate, butylene carbonate, dimethyl carbonate, diethyl carbonate, ethyl methyl carbonate, dimethoxyethane, diethoxyethane, tetrahydrofuran, γ-butyrolactone, and dioxolane. The non-aqueous solvent may be a sole type or a combination of 2 or more types.

As the divalent manganese salt to be added to the non-aqueous electrolyte solution formed by dissolving lithium salt in the non-aqueous solvent, manganese (II) acetate $Mn(CH_3COO)_2$, manganese (II) sulfate $MnSO_4$, manganese (II) benzoate $Mn(C_6H_5COO)_2$, manganese (II) carbonate $MnCO_3$, and manganese (II) nitrate $Mn(NO_3)_2$ and the like may be used. The divalent manganese salt may be a sole type or a combination of 2 or more types.

When the amount of the divalent manganese salt to be added to the non-aqueous electrolyte solution is less than 0.05 mol/l manganese contained in the aluminum foil is not fully prevented from eluting. On the other hand, when the amount of the divalent manganese salt to be added is more than 0.15 mol/l surplus Mn ion exercises a harmful influence. The result of both cases is that the storage characteristics is not fully improved. Therefore, the amount of divalent manganese salt to be added to the non-aqueous electrolyte solution is preferably set in the range of 0.05 to 0.15 mol/l.

The lithium secondary battery according to the present invention is characterized in that the aluminum foil containing manganese is used as the positive electrode current collector and that divalent manganese salt is added to the non-aqueous electrolyte solution. A positive electrode active material for use in its positive electrode and a negative electrode active material for use in its negative electrode are not particularly limited. Therefore, a known material that has been conventionally generally used may be used.

Examples of the positive electrode active material include lithium-containing transition metal oxides such as $LiCoO_2$, $LiNiO_2$, $LiMn_2O_4$, $LiCo_{0.5}Ni_{0.3}Mn_{0.2}O_2$ or $LiMnO_2$, non-lithium-containing transition metal oxides such as $MnO_2$, and sulfides such as $TiS_2$.

Examples of the negative electrode active material include metal oxides such as $TiO_2$ or $Li_2CuO_2$, carbon materials capable of intercalating and deintercalating lithium ions, lithium metal, and lithium alloys.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
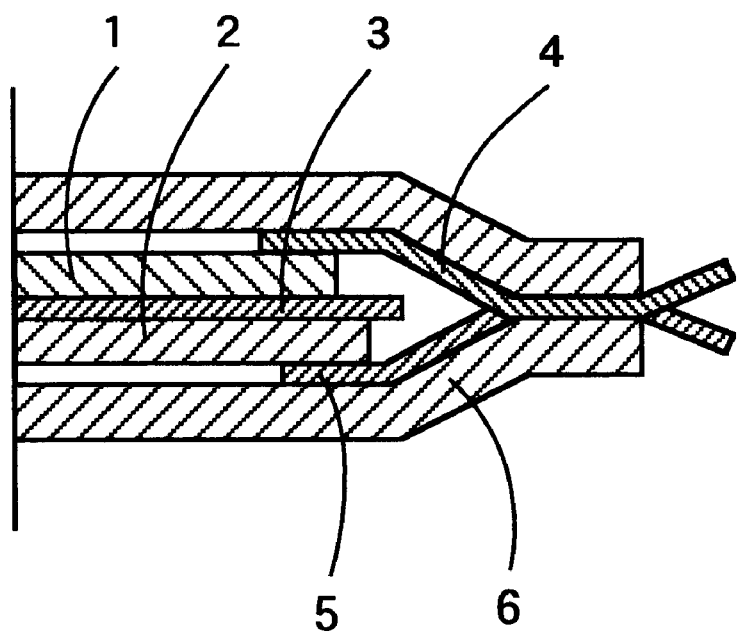
FIG. 1 is a schematic sectional view showing an internal construction of a lithium secondary battery according to examples and comparative examples of the invention.

Lithium secondary batteries according to the examples of the present will be specifically illustrated. Further, comparative examples will be taken to make it clear that the lithium secondary batteries of the examples are improved in storage characteristics. It should be appreciated that the lithium secondary batteries according to the present invention are not particularly limited to those in the following examples, and various changes and modifications may be made in the invention without departing from the spirit and scope thereof.

EXAMPLE A1

In the example A1, a positive electrode and a negative electrode were fabricated in the following manner, and a non-aqueous electrolyte solution was prepared in the following manner to fabricate a card-type lithium secondary battery as shown in FIG. 1.

(Fabrication of Positive Electrode)

In fabricating the positive electrode, $LiMn_2O_4$ as a positive electrode active material, artificial graphite as a conductive agent, and polyvinylidene fluoride as a binding agent were mixed in a weight ratio of 80:10:10. N-methyl-2-pyrolidone was further added to the resultant mixture to prepare a slurry. As a positive electrode current collector, an aluminum foil having a thickness of 20 $\mu$m and composed of the aluminum alloy 3003 of Japanese Industrial Standards containing 1.1 wt % of manganese was used. Subsequently, the above-mentioned slurry was applied to one side of the positive electrode current collector by means of the doctor blade coating method. The slurry on the positive electrode current collector was dried at 150° C. for 2 hours and was then cut into a rectangle which was 3.0 cm long and 6.5 cm wide to obtain the positive electrode.

(Fabrication of Negative Electrode)

In fabricating the negative electrode, natural graphite having 0.335 nm of spacing of planes (002), $d_{002}$, and containing crystallite whose size along the c-axis length (Lc) is not less than 100 nm was used as a negative electrode active material. Natural graphite and polyvinylidene fluoride as the binding agent were mixed in the weight ratio of 90:10. N-methyl-2-pyrolidone was further added to the resultant mixture to prepare the slurry. Subsequently, the slurry was applied to one side of a copper foil having a thickness of 20 $\mu$m as a negative electrode current collector by means of the doctor blade coating method. The slurry on the negative electrode current collector was dried at 150° C. for 2 hours and was then cut into the rectangle which was 4.0 cm long and 7.0 cm wide to obtain the negative electrode.

(Preparation of Non-aqueous Electrolyte Solution)

In preparing the non-aqueous electrolyte solution, a mixed solvent containing ethylene carbonate and diethyl carbonate in a volume ratio of 1:1 was used. $LiN(C_2F_5SO_2)_2$ as lithium salt and manganese (II) acetate $Mn(CH_3COO)_2$ as divalent manganese salt were dissolved in the mixed solvent respectively in a concentration of 1.2 mol/l and 0.1 mol/l to prepare the non-aqueous electrolyte solution.

(Fabrication of Battery)

In fabricating the battery, besides the above-mentioned positive electrode 1, negative electrode 2, and the non-aqueous electrolyte solution, a separator 3 composed of a rectangular polyethylene porous film which was 4.5 cm long and 7.5 cm wide, a positive electrode current collector tub 4 composed of aluminum, a negative electrode current collector tub 5 composed of nickel, an exterior film 6 composed of a 3-layered lamination film of polypropylene, aluminum, and polypropylene were used to fabricate the rectangular card-type lithium secondary battery which was 5.0 cm long and 8.0 cm wide.

In the lithium secondary battery, as shown in FIG. 1, the separator 3 immersed in the above-mentioned non-aqueous electrolyte solution was interposed between the positive electrode 1 and the negative electrode 2, after which they were contained in the exterior film 6. One end of the positive electrode current collector tub 4 was connected to the above-mentioned positive electrode 1, while one end of the negative electrode current collector tub 5 was connected to the above-mentioned negative electrode 2 respectively by means of spot welding, and the another ends of the positive electrode current collector tub 4 and the negative electrode current collector tub 5 were salient to the outside the exterior film 6.

EXAMPLE A2

In the example A2, the mixed solvent containing ethylene carbonate and diethyl carbonate in the volume ratio of 1:1 was used. $LiN(C_2F_5SO_2)_2$ as lithium salt and manganese (II)

sulfate $MnSO_4$ as divalent manganese salt were dissolved in the mixed solvent respectively in the concentration of 1.2 mol/l and 0.1 mol/l to prepare the non-aqueous electrolyte solution. Except for the above, the same procedure as that in the example A1 was taken to prepare a lithium secondary battery according to the example A2.

EXAMPLE A3

In the example A3, the mixed solvent containing ethylene carbonate and diethyl carbonate in the volume ratio of 1:1 was used. $LiN(C_2F_5SO_2)_2$ as lithium salt and manganese (II) benzoate $Mn(C_6H_5COO)_2$ as divalent manganese salt were dissolved in the mixed solvent respectively in the concentration of 1.2 mol/l and 0.1 mol/l to prepare the non-aqueous electrolyte solution. Except for the above, the same procedure as that in the example A1 was taken to prepare a lithium secondary battery according to the example A3.

EXAMPLE A4

In the example A4, the mixed solvent containing ethylene carbonate and diethyl carbonate in the volume ratio of 1:1 was used. $LiN(C_2F_5SO_2)_2$ as lithium salt and manganese (II) carbonate $MnCO_3$ as divalent manganese salt were dissolved in the mixed solvent respectively in the concentration of 1.2 mol/l and 0.1 mol/l to prepare the non-aqueous electrolyte solution. Except for the above, the same procedure as that in the example A1 was taken to prepare a lithium secondary battery according to the example A4.

EXAMPLE A5

In the example A5, the mixed solvent containing ethylene carbonate and diethyl carbonate in the volume ratio of 1:1 was used. $LiN(C_2F_5SO_2)_2$ as lithium salt and manganese (II) nitrate $Mn(NO_3)_2$ as divalent manganese salt were dissolved in the mixed solvent respectively in the concentration of 1.2 mol/l and 0.1 mol/l to prepare the non-aqueous electrolyte solution. Except for the above, the same procedure as that in the example A1 was taken to prepare a lithium secondary battery according to the example A5.

COMPARATIVE EXAMPLE 1

In the comparative example 1, the mixed solvent containing ethylene carbonate and diethyl carbonate in the volume ratio of 1:1 was used. $LiN(C_2F_5SO_2)_2$ as lithium salt was dissolved in the mixed solvent in the concentration of 1.2 mol/l and divalent manganese salt was not dissolved in the mixed solvent. Except for the above, the same procedure as that in the example A1 was taken to prepare a lithium secondary battery according to the comparative example 1.

Each of the lithium secondary batteries in the examples A1 to A5 and comparative example 1 was charged to 4.1 V at a current of 5 mA, and was discharged to 2.7 V at a current of 5 mA to find a discharge capacity before storage C1. Subsequently, each of the above-mentioned batteries was charged to 4.1 V at a current of 5 mA, was the stored for 40 days at a temperature of 60° C., and thereafter, was discharged to 2.7 V at a current of 5 mA to find a discharge capacity after the storage C2. Each of the above-mentioned charge/discharge was carried out at a normal temperature of 25° C.

The percentage of capacity retention after the storage was calculated based on the following equation. The results were shown in the following Table 1. The percentage of capacity retention (%)=(C2/C1)×100

TABLE 1

| | lithium salt | | divalent manganese salt | | percentage of capacity retention (%) |
|---|---|---|---|---|---|
| | type | concentration (mol/l) | type | concentration (mol/l) | |
| example A1 | $LiN(C_2F_5SO_2)_2$ | 1.2 | $Mn(CH_3COO)_2$ | 0.1 | 92 |
| example A2 | $LiN(C_2F_5SO_2)_2$ | 1.2 | $MnSO_4$ | 0.1 | 88 |
| example A3 | $LiN(C_2F_5SO_2)_2$ | 1.2 | $Mn(C_6H_5COO)_2$ | 0.1 | 87 |
| example A4 | $LiN(C_2F_5SO_2)_2$ | 1.2 | $MnCO_3$ | 0.1 | 88 |
| example A5 | $LiN(C_2F_5SO_2)_2$ | 1.2 | $Mn(NO_3)_2$ | 0.1 | 86 |
| comparative example 1 | $LiN(C_2F_5SO_2)_2$ | 1.2 | — | — | 68 |

As apparent from the results, in the lithium secondary batteries in which the aluminum foil containing manganese is used as the positive electrode current collector, each of the lithium secondary batteries in the examples A1 to A5 in which the non-aqueous electrolyte solution to which divalent manganese salt was added is used presented a high percentage of capacity retention and was improved in the storage characteristics compared with the lithium secondary battery in the comparative example 1 in which the non-aqueous electrolyte solution to which divalent manganese salt was not added is used. Especially the lithium secondary battery in the example A1 in which manganese (II) acetate $Mn(CH_3COO)_2$ is used as divalent manganese salt presented a higher percentage of capacity retention and was further improved in the storage characteristics.

EXAMPLES B1 TO B4

In the examples B1 to B4, in preparing the non-aqueous electrolyte solution according to the above-mentioned example A1, the mixed solvent containing ethylene carbonate and diethyl carbonate in the volume ratio of 1:1 was used. $LiN(C_2F_5SO_2)_2$ as lithium salt was dissolved in the mixed solvent in the concentration of 1.2 mol/l. In dissolving manganese (II) acetate $Mn(CH_3COO)_2$ as divalent manganese salt, the concentration was changed respectively to 0.03 mol/l in the example B1, 0.05 mol/l in the example B2, 0.15 mol/l in the example B3, and 0.2 mol/l in the example B4 as shown in the following table 2.

Except for the above, the same procedure as that in the example A1 was taken to fabricate lithium secondary batteries according to examples B1 to B4. The percentage of capacity retention of each of the lithium secondary batteries in examples B1 to B4 thus fabricated was calculated in the same manner as the above-mentioned example A1. The results were shown in the following Table 2.

TABLE 2

| | lithium salt | | divalent manganese salt | | percentage of capacity retention (%) |
|---|---|---|---|---|---|
| | type | concentration (mol/l) | type | concentration (mol/l) | |
| example B1 | $LiN(C_2F_5SO_2)_2$ | 1.2 | $Mn(CH_3COO)_2$ | 0.03 | 84 |
| example B2 | $LiN(C_2F_5SO_2)_2$ | 1.2 | $Mn(CH_3COO)_2$ | 0.05 | 91 |
| example A1 | $LiN(C_2F_5SO_2)_2$ | 1.2 | $Mn(CH_3COO)_2$ | 0.1 | 92 |
| example B3 | $LiN(C_2F_5SO_2)_2$ | 1.2 | $Mn(CH_3COO)_2$ | 0.15 | 91 |
| example B4 | $LiN(C_2F_5SO_2)_2$ | 1.2 | $Mn(CH_3COO)_2$ | 0.2 | 84 |

As apparent from the results, in the lithium secondary batteries in which the aluminum foil containing manganese is used as the positive electrode current collector, each of the lithium secondary batteries in the examples B2, A1 and B3 in which the concentration of manganese (II) acetate $Mn(CH_3COO)_2$ as divalent manganese salt in the non-aqueous electrolyte solution was in the range of 0.05 to 0.15 mol/l presented the high percentage of capacity retention and was improved in the storage characteristics compared with the lithium secondary battery in the example B1 in which the concentration was 0.03 mol/l or the lithium secondary battery in the example B4 in which the concentration was 0.2 mol/l. The concentration of divalent manganese salt in the non-aqueous electrolyte solution was also preferably set in the range of 0.05 to 0.15 mol/l in a case in which another divalent manganese salt shown in the above-mentioned examples A2 to A5 was used.

EXAMPLES C1 TO C6

In the examples C1 to C6, in preparing the non-aqueous electrolyte solution according to the above-mentioned example A1, the mixed solvent containing ethylene carbonate and diethyl carbonate in the volume ratio of 1:1 was used. The type of lithium salt to be dissolved in the mixed solvent was changed. $LiN(CF_3SO_2)(C_4F_9SO_2)$ in the example C1, $LiC(CF_3SO_2)_3$ in the example C2, $LiN(CF_3SO_2)(C_2F_5SO_2)$ in the example C3, $LiN(CF_3SO_2)_2$ in the example C4, $LiPF_6$ in the example C5, and $LiClO_4$ in the example C6 was dissolved in the mixed solvent respectively in the concentration of 1.2 mol/l as shown in the following Table 3.

Except for the above, the same procedure as that in the example A1 was taken to prepare each of the non-aqueous electrolyte solution and to fabricate lithium secondary batteries according to examples C1 to C6 using the non-aqueous electrolyte solution thus prepared.

The percentage of capacity retention of each of the lithium secondary batteries according to examples C1 to C6 thus fabricated was calculated in the same manner as the above-mentioned example A1. The results were shown in the following Table 3.

TABLE 3

| | divalent manganese salt $Mn(CH_3COO)_2$ (0.1 mol/l) | | |
|---|---|---|---|
| | lithium salt | | percentage of capacity retention (%) |
| | type | concentration (mol/l) | |
| example A1 | $LiN(C_2F_5SO_2)_2$ | 1.2 | 92 |
| example C1 | $LiN(CF_3SO_2)(C_4F_9SO_2)$ | 1.2 | 90 |
| example C2 | $LiC(CF_3SO_2)_3$ | 1.2 | 90 |
| example C3 | $LiN(CF_3SO_2)(C_2F_5SO_2)$ | 1.2 | 87 |
| example C4 | $LiN(CF_3SO_2)_2$ | 1.2 | 81 |
| example C5 | $LiPF_6$ | 1.2 | 80 |
| example C6 | $LiClO_4$ | 1.2 | 78 |

As apparent from the results, each of the lithium secondary batteries in the examples A1 and C1 to C3 in which $LiN(C_2F_5SO_2)_2$, $LiN(CF_3SO_2)(C_4F_9SO_2)$, $LiC(CF_3SO_2)_3$, and $LiN(CF_3SO_2)(C_2F_5SO_2)$ are used as lithium salt to be dissolved in the non-aqueous electrolyte solution presented the high percentage of capacity retention and was improved in the storage characteristics compared with the lithium secondary batteries in the examples C4 to C6 in which $LiN(CF_3SO_2)_2$, $LiPF_6$, and $LiClO_4$ are used as the lithium salt. Especially the lithium secondary battery in the example A1 in which $LiN(C_2F_5SO_2)_2$ is used presented the higher percentage of capacity retention and was further improved in the storage characteristics.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A lithium secondary battery provided with a positive electrode in which an aluminum foil containing manganese is used as a current collector, a negative electrode, and a non-aqueous electrolyte solution formed by dissolving lithium salt in a non-aqueous solvent, wherein
   divalent manganese salt is added to said non-aqueous electrolyte solution.

2. The lithium secondary battery according to claim 1, wherein
   said aluminum foil used as the current collector contains 0.6 to 2.0 wt % of manganese.

3. The lithium secondary battery according to claim 1, wherein
   said divalent manganese salt to be added to the non-aqueous electrolyte solution is at least one type of divalent manganese salt selected from a group consisting of manganese (II) acetate, manganese (II) sulfate, manganese (II) benzoate, manganese (II) carbonate, and manganese (II) nitrate.

4. The lithium secondary battery according to claim 1, wherein
   said divalent manganese salt to be added to the non-aqueous electrolyte solution is manganese (II) acetate.

5. The lithium secondary battery according to claim 1, wherein
   an amount of said divalent manganese salt to be added to the non-aqueous electrolyte solution is in a range of 0.05 to 0.15 mol/l.

6. The lithium secondary battery according to claim 1, wherein said lithium salt used in the non-aqueous electrolyte solution is represented by a constitutional formula $LiN(R^1SO_2)(R^2SO_2)$ in which said $R^1$ and $R^2$ are of perfluoro alkyl group, said $R^1$ and $R^2$ may be the same or different from each other, and a total of number of carbon in said $R^1$ and $R^2$ is not less than 3.

7. The lithium secondary battery according to claim 6, wherein
the total of the number of carbon in said $R^1$ and $R^2$ is in the range of 3 to 6.

8. The lithium secondary battery according to claim 1, wherein
said lithium salt used in the non-aqueous electrolyte solution is represented by the constitutional formula $LiC(R^3SO_2)(R^4SO_2)(R^5SO_2)$ in which said $R^3$, $R^4$, and $R^5$ are of perfluoro alkyl group, said $R^3$, $R^4$, and $R^5$ may be the same or different from each other, and the total of the number of carbon in said $R^3$, $R^4$, and $R^5$ is not less than 3.

9. The lithium secondary battery according to claim 8, wherein
the total of the number of carbon in said $R^3$, $R^4$, and $R^5$ is in the range of 3 to 6.

10. The lithium secondary battery according to claim 1, wherein
said lithium salt used in the non-aqueous electrolyte solution is at least one type of lithium salt selected from the group consisting of $LiN(C_2F_5SO_2)_2$, $LiN(CF_3SO_2)(C_4F_9SO_2)$, and $LiC(CF_3SO_2)_3$.

11. The lithium secondary battery according to claim 1, wherein
said lithium salt used in the non-aqueous electrolyte solution is $LiN(C_2F_5SO_2)_2$.

* * * * *